United States Patent [19]
Hass et al.

[11] 3,879,532
[45] Apr. 22, 1975

[54] CONTROL BY ISOXAZOLES OF ENDOPARASITIC NEMATODES

[75] Inventors: Duane K. Hass; John B. Carr, both of Modesto, Calif.

[73] Assignee: Shell Oil Company, Houston, Tex.

[22] Filed: Jan. 18, 1974

[21] Appl. No.: 434,523

[52] U.S. Cl. ................................................ 424/272
[51] Int. Cl. ........................................... A61k 27/00
[58] Field of Search .................................... 424/272

[56] References Cited
UNITED STATES PATENTS
3,781,438   12/1973   Gibbons ............................. 424/272

OTHER PUBLICATIONS

Chemical Abstracts, Vol. 56, (1962), p. 12869e.

Chemical Abstracts, Vol. 52, (1958), p. 6169d.

Primary Examiner—V. D. Turner

[57] ABSTRACT

Nematode parasites of warm-blooded animals are controlled by certain 3-halo-5-(halo-)phenylisoxazoles.

7 Claims, No Drawings

CONTROL BY ISOXAZOLES OF ENDOPARASITIC NEMATODES

DESCRIPTION OF THE INVENTION

It has been found that isoxazoles of the formula:

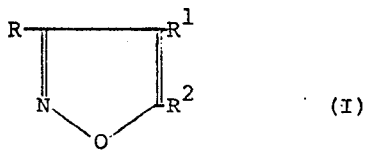

wherein R is halogen, preferably middle halogen (i.e., Cl or Br), $R^1$ is hydrogen or halogen, preferably middle halogen, and $R^2$ is phenyl or halogen-substituted phenyl, effectively control nematode endoparasites without harm to the parasitized animal when used at the nematocidally effective dosage.

$R^2$ suitably can be mono- or polyhalophenyl; preferably each halogen is middle halogen.

Highest activity appears to be associated with the classes wherein (a) R is middle halogen, $R^1$ is hydrogen and $R^2$ is phenyl, 4-(middle halo)phenyl or 2,4-di(middle halo)phenyl and (b) R and $R^1$ each is middle halogen and $R^2$ is phenyl, 4-(middle halo)phenyl or 2,4-di(middle halo)phenyl. Consequently, these are preferred classes of these nematocides. Of these classes, the preferred subclasses are those wherein all of the halogen atoms are chlorine.

The species of this class of isoxazoles wherein R is chlorine, $R^1$ is hydrogen and $R^2$ is phenyl is disclosed in Bravo et al, Gazz. Chim. Ital. 91, 47–64 (1961) (56 C.A. 12869 e/f (1962)) as the product of the condensation of phosgene oxime with the Grignard of phenylacetylene. The corresponding bromo analog is disclosed in Fusco et al, Chem. and Ind., 1650 (1957) (52 C.A. 6169b (1958)), as the product of the hydrobromic acid cyclization of 3-nitropropiophenone. Other species of the subclass wherein R is middle halogen, $R^1$ is hydrogen and $R^2$ is phenyl or halogen-substituted phenyl can be prepared by the methods disclosed in these references, the procedure of Fusco et al being preferable since it avoids use of the highly toxic phosgene oxime. In using the Fusco et al procedure, it may be found desirable to conduct the reaction in the presence of a solvent for the nitro-ketone reactant; a suitable solvent is acetic acid. The 3-nitropropiophenones can be prepared by acylation of the appropriately substituted benzenes with 3-chloropropionyl chloride, aluminum chloride being used as catalyst and an excess of the substituted benzene as solvent, and subsequent reaction with sodium nitrite.

Species of this subclass wherein R is iodine can be prepared in a manner analogous to the following preparation of the species wherein R is I, $R^1$ is H, $R^2$ is phenyl. 10 ml of an aqueous solution containing 2.35 g of sodium nitrite was added dropwise below the surface to a stirred 25 ml concentrated hydrochloric acid/25 ml water solution of 5 g of 3-amino-5-phenylisoxazole while maintaining the temperature below 5°C by application of a dry ice/acetone bath. After the addition was complete, the reaction mixture was stirred for 10 minutes, then checked for excess nitrous acid with starch-iodide paper. 7.9 g of potassium iodide in 20 ml water was added to the reaction mixture. The resulting mixture was stirred at room temperature for 20 hours, then extracted with methylene chloride. The combined extracts were washed with a solution of 25%w sodium bisulfite in water, dried with magnesium sulfate and stripped of solvent to give 5.2 g crude product. Dry column chromatography through silica gel G with a tetrahydrofuran/ethyl acetate/hexane (4:30:66) mixture as solvent, followed by charcoal treatment of the resulting product in hexane and crystallization gave 0.6 g of 3-iodo-5-phenylisoxazole as a cream solid melting at 106.5°–109°C. The 3-amino-5-phenylisoxazole was prepared from phenylpropiolonitrile and hydroxylamine according to the method of Iwai and Nakamura, Chem. Pharm. Bull. 14 1,277–86 (1966) (67 C.A. 32627j (1967)). Phenylpropiolonitrile was prepared by the method of Yamato and Sagasawa, Tetrahedron Letters, 4,383–4 (1970) (74 C.A. 127881 (1970)).

The species of the invention wherein R and $R^1$ each is chlorine and $R^2$ is phenyl is disclosed in Nesmeyanov et al, Khim. Geterotsikl. Soedin., 3 (5) 800–805 (1957) (68 C.A. 104,557t (1968)). It, as well as other species wherein R and/or $R^1$ is a different middle halogen, can be prepared in the manner described in Nesmeyanov et al, or they can be prepared by treatment of the appropriate 3-halo-5-(halo)phenylisoxazole with an excess of the appropriate sulfuryl halide. The 4-iodo analogs can be prepared by treatment of the 3-halo-5-(halo)-phenylisoxazole with iodine in the presence of either nitric acid, a nitric acid-sulfuric acid mixture or 30% hydrogen peroxide as described by Kotchetkov et al, Zhur. Obshchei Khimii, 31 (7), 2,326–2,333 (1961) (56 C.A. 3465i (1962)).

The activity of the nematocides of this invention with respect to nematode parasites of warm-blooded animals and their relatively low toxicity with respect to the host animals — that is, their safety — were demonstrated by the following tests:

Mammalian Toxicity

This is defined as the maximum tolerated dosage (MTD), milligrams of test compound per kilogram of animal body weight, and was determined as follows: by intubation a group of rats was treated with a dosage of 500 milligrams of test compound per kilogram of rat body weight. If any of the rats died, further groups of rats were treated with successively smaller dosages of the test compound, until a dosage was found that all of the rats survived. This value (500 milligrams or less) was recorded as the maximum tolerated dose.

Anthelmintic Activity

This is reported as the percent clearance of parasites from the test animal at a given dosage of the test chemical, in milligrams of test chemical per kilogram of the body weight of the test animal. This value was determined in each case as follows: male rats, each weighing approximately 50 grams, were exposed subcutaneously to approximately 500 *Nippostrongylus brasiliensis* (rat roundworm) infective larvae. Each test chemical was mixed with a suitable vehicle, such as corn oil or 1% methocel solution, at approximate concentrations to give one or more of the following dosage levels: 500, 250, 125, 62, 31 or 16 milligrams test chemical per kilogram of rat body weight. (Example: at a dosage of 50 milligrams test chemical per milliliter of vehicle given at the rate of 1 milliliter per 100 grams of rat body weight would result in a dose of 500 milligrams test chemical per kilogram of rat body weight.) Two weeks after exposure to the infection, the infected rats were treated with the contemplated dosages of the test chemicals via gastric intubation. The treated rats then were held overnight without food or water and killed. The small intestine from each rat was removed, compressed between heavy glass plates and the number of worms remaining in the intestine were counted. Suitable control rats were included in each study.

The percent control was determined by the formula:
%control = (NCA − NTA)/NCA × 100
where
NCA = average number of parasites in the control animals;
NTA = average number of parasites in the treated animals.

The following table reports the results. In the table each test chemical is identified by the moieties "R," "R¹," "R²," referring to Formula (I).

| Test Chemical (Formula I) | | | MTD | Nematocidal Activity (% Control at Indicated Dosage) | |
| --- | --- | --- | --- | --- | --- |
| R | R¹ | R² | | 125 | 31 |
| Cl | H | phenyl | 500 | >95 | 75 |
| Cl | H | 4-chlorophenyl | 500 | >95 | 75 |
| Br | H | phenyl | 500 | >95 | 15 |
| Cl | Cl | phenyl | 500 | >95 | >95 |
| I | H | phenyl | 500 | 75 | 15 |
| Cl | H | 3,4-dichlorophenyl | 500 | 40 | 35 |
| Br | H | 4-chlorophenyl | 500 | 65 | —* |
| Cl | H | 2,4-dichlorophenyl | 500 | 100 | 60 |

*Not tested

The nematocides of this invention can be used to control endo-parasitic nematodes generally, including roundworms, pinworms, shipworms, hookworms, threadworms, nodular worms, cecal worms, stomach worms, gullet worms, hairworms, thorn-headed worms, threadnecked worms, cooperias, and the like. Thus these anthelmintics can be used to control species of nematodes of the genera Haemonchus, Hyostrongylus, Trichostrongylus, Ostertagia, Ascarops, Cooperia, Trichuris, Oesophagostomum, Strongyloides, Ascaris, Nematodirus, Ancylostoma, Necator, Gasterophilus, Enterubius, Nematospiroides and Syphacia, to name some typical genera.

These nematocides are effective in controlling endoparasitic nematodes of mammals and birds, generally, and more particularly in controlling such nematodes in livestock such as cattle, swine, sheep and goats, in domestic pets, such as dogs and cats, in rabbits, in poultry such as chickens, turkeys, ducks, geese and the like, and in fur-bearing animals such as mink, foxes, chinchilla and the like.

These nematocides can be employed by the conventional means and techniques known in the anthelmintic art. They can be used to eradicate parasites already present or they can be used prophylactically. That is, they can be used to kill an already present infestation or can be used to prevent infestation.

The dosage of the nematocide to be used will depend upon the particular kind or kinds of parasites to be controlled; the particular compound to be used, the kind of host animal, whether the nematocide is to be used to cure an already existing infection, or as a prophylactic, and the like. These factors are those ordinarily encountered in the treatment of animals to cure and/or prevent their infestation by nematodes. These factors and their solution are well known to the practitioners in the art. In general, however, larger doses are required to cure an already-existing infestation than are required for prophylaxis. Thus, dosages of the nematocide to provide as little as 1 milligram of the nematocide per kilogram of live body weight of the animal fed at regular intervals, twice daily or daily, for example, may be sufficient to prevent infestation of animals by nematodes.

However, prophylactic dosages ordinarily will amount to about 2–10 milligrams of the nematocide per kilogram of the animal body weight. The dosage required to eradicate already existing nematodes ordinarily will be at least 10 milligrams of the nematocide per kilogram of the animal body weight, with usual dosages being about 15 to 125 milligrams on the same basis. The maximum dosage, of course, in every case will be determined by the toxicity of the nematocide to the host animal. The nematocides of this invention effectively eradicate endoparasitic nematodes without ill effect upon the host animal.

These nematocides can be administered as a single dose, or alternatively, in multiple doses. They can be employed in any of a variety of dosage forms, which may include the nematocide alone or in combination with a pharmaceutical adjuvant or excipient such as a solid or liquid diluent, buffer, binder, coating material, preservative, emulsifier, or the like. Solid dosage forms such as tablets, capsules, and boluses comprising the nematocide and one or more compatible pharmaceutically acceptable carriers can be employed with good results. In addition, of course, the solid dosage forms can contain one or more of the commonly employed tablet lubricants, tablet disintegrants and the like. Liquid compositions containing the nematocide are equally effective for controlling the parasites. Such compositions can take the form of solutions, suspensions, drenches and the like and can be administered orally in single or multiple doses.

The invention claimed is:

1. A method for controlling endoparasitic nematodes in warm-blooded animals which comprises orally administering to the animal a nematocidally effective dosage of an isoxazole of the formula

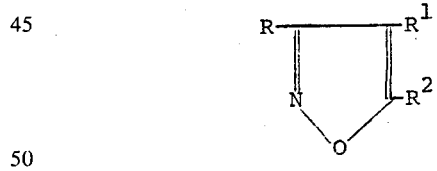

wherein R is halogen, R¹ is hydrogen or halogen and R² is phenyl or halogen-substituted phenyl.

2. A method according to claim 1 wherein R is middle halogen, R¹ is hydrogen and R² is phenyl, 4-(middle halo)phenyl or 2,4-di(middle halo)phenyl.

3. A method according to claim 2 wherein the halogen in each instance is chlorine.

4. A method according to claim 3 wherein R² is phenyl.

5. A method according to claim 3 wherein R² is 4-chlorophenyl.

6. A method according to claim 1 wherein R and R¹ each is middle halogen and R² is phenyl, 4-(middle halo)phenyl or 2,4-di(middle halo)phenyl.

7. A method according to claim 6 wherein R and R¹ each is chlorine and R² is phenyl.

* * * * *